July 24, 1962    J. FERRERA    3,046,047
FLOOR SUPPORTING STRUCTURE FOR EXPANDABLE TRAILERS
Filed June 5, 1961    2 Sheets-Sheet 1
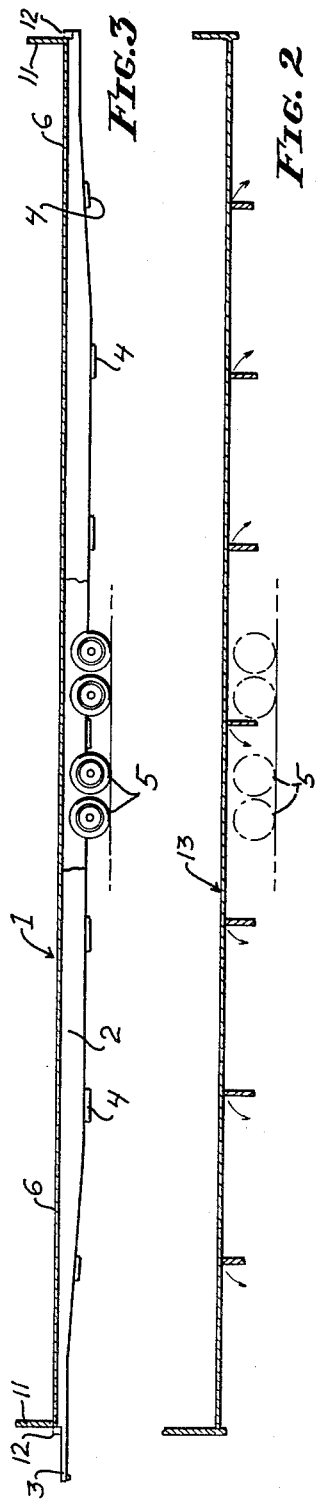
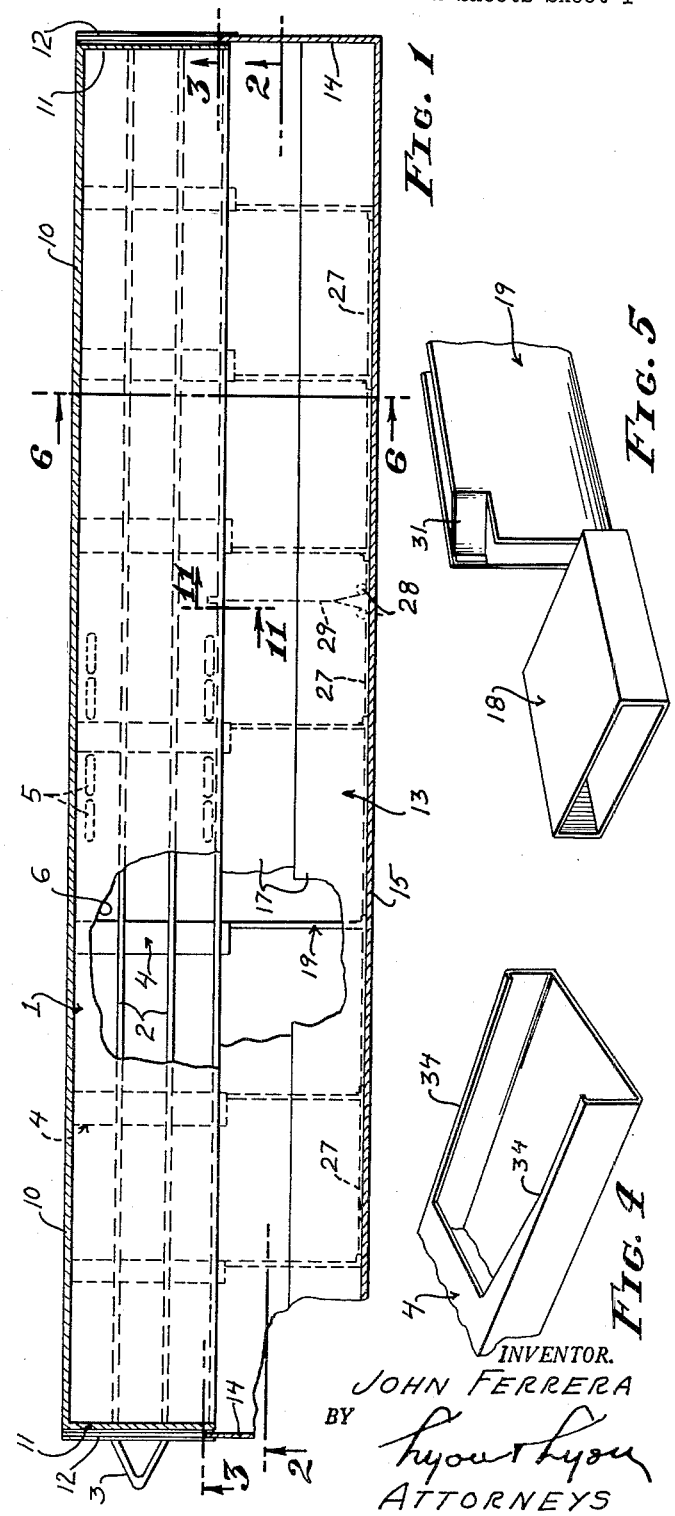
INVENTOR.
JOHN FERRERA
BY
ATTORNEYS

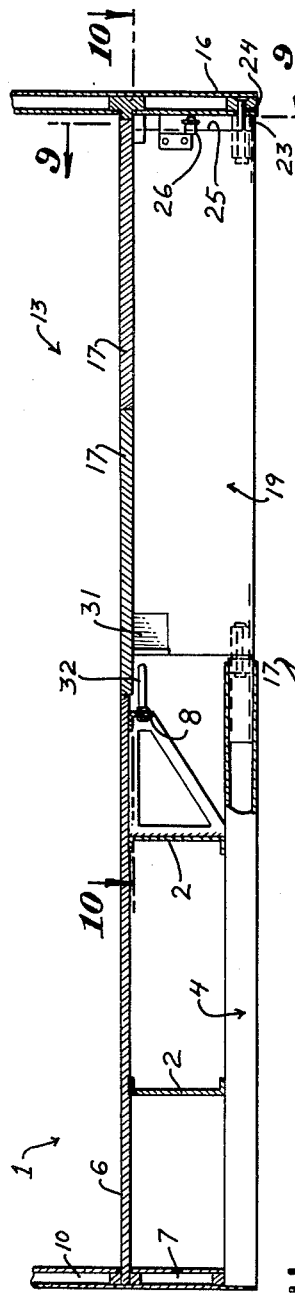

United States Patent Office 3,046,047
Patented July 24, 1962

3,046,047
FLOOR SUPPORTING STRUCTURE FOR EXPANDABLE TRAILERS
John Ferrera, 10838 Rose Ave., Los Angeles, Calif.
Filed June 5, 1961, Ser. No. 114,785
10 Claims. (Cl. 296—23)

This invention relates to floor supporting structure for expandable trailers, and included in the objects of this invention are:

First, to provide a floor supporting structure which is particularly adapted for incorporation in the type of trailer disclosed in the following patents: Patent No. 2,898,143, issued August 4, 1959, Patent No. 2,898,144, issued August 4, 1959, Patent No. 2,902,312, issued September 1, 1959.

Second, to provide a floor supporting structure for an expandable trailer having a fixed trailer section including a fixed floor and an expandable trailer section having a foldable floor, the floor supporting structure including novelly arranged transverse floor joists which telescope in a horizontal or flat position and which, when extended, pivot into edgewise floor supporting positions.

Third, to provide a floor supporting structure for expandable trailers of this type which provides maximum clearance under the fixed floor structure for installation of plumbing, air conditioning ducts, and electrical wiring.

Fourth, to provide a floor supporting structure for trailers, particularly trailers of large sizes, commonly referred to as "mobile homes," which enables the floor to be located at a minimum elevation above the ground while providing the required ground clearance.

With the above and other objects in view, as may appear hereinafter, reference is directed to the accompanying drawings in which:

FIGURE 1 is a substantially diagrammatical plan view of an expandable trailer incorporating the floor supporting structure;

FIGURE 2 is a longitudinal, sectional view thereof through 2—2 of FIGURE 1;

FIGURE 3 is a longitudinal, sectional view thereof through 3—3 of FIGURE 1;

FIGURE 4 is a fragmentary, perspective view showing an end of one of the casing members;

FIGURE 5 is a fragmentary, perspective view showing one end of a cross beam and its anchor guide;

FIGURE 6 is an enlarged, transverse, sectional view through 6—6 of FIGURE 1, showing the trailer in its expanded position;

FIGURE 7 is a similar transverse, sectional view showing the trailer in its retracted position;

FIGURE 8 is a fragmentary, sectional view through 8—8 of FIGURE 7;

FIGURE 9 is a fragmentary, sectional view through 9—9 of FIGURE 6;

FIGURE 10 is a fragmentary, sectional view through 10—10 of FIGURE 6 with the floor removed;

FIGURE 11 is a fragmentary, sectional view through 11—11 of FIGURE 1.

One type of trailer for which the floor supporting structure is adapted is more fully disclosed in the aforementioned patents. The trailer includes a fixed trailer section 1, which includes a chassis frame having longitudinal rail or beam members 2 converging at one end to form a trailer hitch 3.

The longitudinal rail or beam members 2 are joined by transversely extending cross members or casing members 4 which are located below the rail members 2. The casing members 4 are rectangular in cross section, and each casing member has a width or horizontal dimension approximating the distance between the casing member and the plane defined by the upper surfaces of the rail members 2. The chassis frame is suitably supported on wheels 5.

Secured to the rail or beam members 2 is a fixed floor 6 which extends laterally of the rail members 2. One margin of the fixed floor 6 is provided with an underlying base beam 7. The opposite margin of the fixed floor rests on a marginal rail 8 which is supported from the adjacent longitudinal rail 2 by triangular brackets 9.

Supported on the fixed floor 6 is a longitudinally extending side wall 10 and end walls 11. The walls support a suitable roof structure, not shown.

Outwardly of the end walls 11 the fixed trailer section 1 is provided with telescoping track means 12 which support the ends of a movable trailer section 13. The movable trailer section 13 includes end walls 14 and a longitudinally extending side wall 15 which is supported by a base beam 16. The walls of the movable trailer section 13 support a suitable roof structure, not shown.

Interposed between the base beam 16 and the adjacent edge of the fixed floor 6 is a pair of longitudinally extending floor panels 17 which are hinged to each other, to the fixed floor 6, and to the base beam 16. The floor panels 17 are adapted to move between an unfolded condition flush or coplanar with the fixed floor 6, as shown in FIGURE 6, and a folded condition in which the floor panels extend upwardly in adjacent parallel relation, as shown best in FIGURE 7.

Slidably mounted in each casing member 4 is an anchor guide 18. Each anchor guide is rectangular in cross section and may be formed of sheet metal. Also slidably mounted in each casing member 4 is a cross beam 19. Each cross beam may be formed of sheet metal and may be U-shaped in cross section. Each anchor guide 18 and its cross beam 19 confronts each other and are provided with pivot blocks 20 and 21 which are joined by a pivot pin 22.

The pivot blocks 20 and 21 and pivot pin 22 are located at one lateral edge of the anchor guide 18 and cross beam 19. The distance between the axis of the pivot pin 22 and the distal edge of the cross beam 19 approximates the vertical distance between the pivot pin and the underside of the foldable floor panels 17, so that when the cross beam 19 is extended from the casing member 4 and positioned edgewise its upper edge is in position to support the floor panels 17.

The outer extremity of each cross beam 19 is provided with a pivot block 23 which receives a pivot pin 24 coaxial with the pivot pin 22. The pivot pin 24 extends into the lower portion of the base beam 16. The pivot block 23 preferably protrudes a short distance beyond the cross beam 19 so as to form a slot 25 between the outer end of the cross beam 19 and the base beam 16.

Secured to the outer end of each cross beam 19 is a bracket 26 having an eyelet which is so located as to define with the axis of the pivot pin 24 and the plane of the cross beam 19 an angle of approximately 45°. The set of cross beams 19 is divided into two groups, and the brackets 26 of each group are joined together by cables 27 extending from the extreme cross beams near the forward and rearward ends of the trailer to a point intermediate the ends of the trailer.

The adjacent ends of the cables 27 pass around pulleys 28 and are joined to a main cable 29 which extends transversely under the floor panels 17 to the fixed floor 6. The extremity of the main cable 29 is received in a tape-up reel 30.

The inner end of each cross beam 19, adjacent the anchor guide 18, is provided at its corner remote from the pivot pin 22 with a cam 31 formed by slitting one side of the cross beam 19 to form a tab and bending this tab into angular relation, as shown best in FIGURE 5. Extending from the marginal rail 8 at appropriate locations is a series of cam pins 32, each adapted to engage a corresponding cam 31 so as to deflect the cross beams 19 from their edgewise condition to their flatwise condition.

In order to accommodate movement of the cross beams 19, the ends of the casing members 4, projecting laterally beyond the longitudinal rails 2 under the marginal rail 8, are provided in their upper surfaces with slots 33. The margins of the solts 33 form retainer flanges 34 for the anchor guides 18, which are slighlty wider than the cross beams 19.

Operation of the floor supporting structure for expandable trailers is as follows:

When the trailer is in its retracted or collapsed position, the anchor guides 18 and cross beams 19 are telescoped within the casing members 4, the floor panels 17 are in their folded condition and extend upwardly in parallel adjacent relation with each other, and the base beam 16 is contiguous to the fixed floor 6, as shown best in FIGURE 7.

When it is desired to expand the trailer, the movable section 13 is caused to travel outwardly on the track means 12, as more fully disclosed in the aforementioned patents. As the movable trailer section 13 approaches its extreme position, the main cable 29 is restrained from further movement which causes the cables 27, acting through the brackets 26, to tilt or pivot the cross beams 19 from their flat condition shown in FIGURE 8 to their edgewise condition shown in FIGURE 9. The movement of the cross beams 19 is mechanically timed so that they reach their edgewise or floor supporting condition just as the floor approaches its unfolded or coplanar condition.

In order to prevent overtravel of the cross beam 19, stops 35 are provided which may be supported from the base beam 16. The cables may be preadjusted so that the cross beams 19 reach their edgewise position simultaneously, or if desired coil springs may be interposed in the cables to allow limited difference in movement of the cross beams 19.

When it is desired to retract the movable trailer section 13, the floor panels 17 are given an upward thrust, and the side wall 15 and base beam 16 are moved toward the fixed trailer section 1, this being accomplished by means shown in the aforementioned patents. During the initial retracting movement, the cam pins 32 engage the cam 31 to tilt the cross beams 19 so that they fall from their edgewise condition to their flatwise condition.

In this connection it should be observed that the take-up reel 30 only exerts enough force to take up the slack of the main cable 29, and is not sufficient to resist the force exerted by the cross beams 19 as they fall to their flatwise condition. Once the cross beams 19 are in their flatwise condition, continued retraction of the movable trailer section 13 fully telescopes the cross beams 19 into the casing members 4.

While a particular embodiment of this invention has been shown and described, it is not intended to limit the same to the exact details of the construction set forth, and it embraces such changes, modifications, and equivalents of the parts and their formation and arrangement as comes within the purview of the appended claims.

What is claimed is:

1. A floor supporting structure for trailers of the type having a fixed floor, a longitudinally extending foldable floor hinged to one side thereof and movable between an upwardly extended folded condition and a coplanar extended position, and a longitudinal base beam bordering the edge of the foldable floor distal from the fixed floor, said structure comprising: longitudinally extending floor beams under said fixed floor; a set of transversely extending tubular casing members of rectangular cross section connected to said floor beams and spaced from said fixed floor, said casing members disposed in a flatwise condition with their major transverse dimension in a horizontal plane; a plurality of cross beams slidable in said casing members between retracted and extended positions; means pivotally connecting said cross beams to said casing members and to said base beam; and means operable, when said cross beams are extended, to rotate said cross beams between a flatwise condition for sliding movement into said casing members and an edgewise condition for supporting said foldable floor.

2. A floor supporting structure for trailers of the type having a fixed floor, a longitudinally extending foldable floor hinged to one side thereof and movable between an upwardly extended folded condition and a coplanar extended position, and a longitudinal base beam bordering the edge of the foldable floor distal from the fixed floor, said structure comprising: longitudinally extending floor beams under said fixed floor; a set of transversely extending tubular casing members of rectangular cross section connected to said floor beams and spaced from said fixed floor, said casing members disposed in a flatwise condition with their major transverse dimension in a horizontal plane; a plurality of cross beams slidable in said casing members between retracted and extended positions; a pair of aligned pivots at the extremities of each cross beam offset from the longitudinal axis thereof, one of said pivots being connected to said base beam to support said cross beam therefrom; an anchor member slidable in each casing member, and connected by the other of said pivots to the corresponding cross beam; and means operable, when said cross beams are extended, to rotate said cross beams about the axes of said pivots between a flatwise condition for sliding movement in said casing members and an edgewise condition for supporting said foldable floor.

3. A floor supporting structure for trailers of the type having a fixed floor, a longitudinally extending foldable floor hinged to one side thereof and movable between an upwardly extended folded condition and a coplanar extended position, and a longitudinal base beam bordering the edge of the foldable floor distal from the fixed floor, said structure comprising: longitudinally extending floor beams under said fixed floor; a set of transversely extending tubular casing members of rectangular cross section connected to said floor beams and spaced from said fixed floor, said casing members disposed in a flatwise condition with their major transverse dimension in a horizontal plane; a plurality of cross beams slidable in said casing members between retracted and extended positions; a pair of aligned pivots at the extremities of each cross beam offset from the longitudinal axis thereof, one of said pivots being connected to said base beam to support said cross beam therefrom; an anchor member slidable in each casing member, and connected by the other of said pivots to the corresponding cross beam; a tilting bracket mounted on each cross beam; a cable series connecting said tilting brackets; and means anchoring said cable to exert tension thereon when said cross beams approach their extended position thereby to tilt said cross beams from a flatwise condition and an edgewise position.

4. A floor supporting structure for trailers of the type having a fixed floor, a longitudinally extending foldable floor hinged to one side thereof and movable between an upwardly extended folded condition and a coplanar extended position, and a longitudinal base beam bordering the edge of the foldable floor distal from the fixed floor, said structure comprising: longitudinally extending floor beams under said fixed floor; a set of transversely extending tubular casing members of rectangular cross section connected to said floor beams and spaced from said fixed floor, said casing members disposed in a flatwise condition with their major transverse dimension in a horizontal plane; a plurality of cross beams slidable in said casing members between retracted and extended positions; a pair of aligned pivots at the extremities of each cross beam offset from the longitudinal axis thereof, one of said pivots being connected to said base beam to support said cross beam therefrom; an anchor member slidable in each casing member, and connected by the other of said pivots to the corresponding cross beam; a tilting bracket mounted on each cross beam; a cable series connecting said tilting brackets; means anchoring said cable to exert tension thereon when said cross beams approach their extended position thereby to tilt said cross beams from a flatwise condition and an edgewise position; and cooperating cam and cam-engaging means on said cross beams and adjacent the casing members for deflecting said cross beams to their flatwise condition as retraction of said cross beams is initialed, to position said cross beams for entrance into said casing members.

5. A floor supporting structure for expandable trailers, comprising: a chassis including longitudinal rail members and a plurality of transversely disposed casing members underlying and connecting said rail members, said casing members being rectangular in cross section and disposed flatwise, and having transverse widths approximating the distance between said casing members and a plane defined by the upper surfaces of said rail members; a set of cross beams of rectangular cross section slidable in said casing members between retracted and extended positions; a longitudinal beam overlying the extremities of said cross beams; coaxial pivot means at the extremities of said cross beams, connecting said cross beams to said casing members and to said longitudinal beam; and means operable, when said cross beams are extended, to rotate said cross beams between a flatwise condition for sliding movement into said casing members and an edgewise condition, the vertical distance between said pivot means and the upper edge of said cross beams, when said cross beams are edgewise disposed, approximating the distance from said pivot means to the upper surface of said longitudinal rail members.

6. A floor supporting structure for expandable trailers, comprising: a chassis including longitudinal rail members and a plurality of transversely disposed casing members underlying and connecting said rail members, said casing members being rectangular in cross section and disposed flatwise, and having transverse widths approximating the distance between said casing members and a plane defined by the upper surfaces of said rail members; a set of cross beams of rectangular cross section slidable in said casing members between retracted and extended positions; anchor guides slidable in said casing members inwardly of said cross beams; pivot means offset from the longitudinal axes of said beams interconnecting said anchor guides and said cross beams, the distance between the axis of said pivot means and the distal edges of said cross beams approximating the distance from said pivot means axes and the upper surfaces of said longitudinal rail members; a longitudinal beam at the extremities of said cross beams; and pivot elements coaxial with said pivot means connecting said cross beams to said longitudinal beam, said cross beams being pivotable by said pivot means and pivot elements between a flat position for sliding movement in said casing members and an edgewise position for cooperation with said longitudinal rail members to support a floor.

7. A floor supporting structure for expandable trailers, comprising: a chassis including longitudinal rail members and a plurality of transversely disposed casing members underlying and connecting said rail members, said casing members being rectangular in cross section and disposed flatwise, and having transverse widths approximating the distance between said casing members and a plane defined by the upper surfaces of said rail members; a set of cross beams of rectangular cross section slidable in said casing members between retracted and extended positions; anchor guides slidable in said casing members inwardly of said cross beams; pivot means offset from the longitudinal axes of said beams interconnecting said anchor guides and said cross beams, the distance between the axis of said pivot means and the distal edges of said cross beams approximating the distance from said pivot means axes and the upper surfaces of said longitudinal rail members; a longitudinal beam at the extremities of said cross beams; pivot elements coaxial with said pivot means connecting said cross beams to said longitudinal beam, said cross beams being pivotable by said pivot means and pivot elements between a flat position for sliding movement in said casing members and an edgewise position for cooperation with said longitudinal rail members to support a floor; means operable as said cross beams reach their extended positions for simultaneously pivoting said cross beams to their edgewise position; and means operable on initial retraction of said cross beams for pivoting said cross beams to their flatwise condition for sliding movement into side casing members.

8. A floor supporting structure for expandable trailers having a fixed section and a movable section, the fixed section having a fixed floor, the movable section having a longtudinally extending base beam movable to and from the fixed floor, and a pair of longitudinally foldable floor panels hinged to each other and to said fixed floor and base beam, for movement between an unfolded condition coplanar with said fixed ffoor and an upwardly folded condition, said supporting structure comprising: an under frame for the fixed floor including transversely disposed casing members of greater horizontal width than vertical height, the horizontal width approximating the vertical distance between said casing members and said fixed floor; a set of cross beams of rectangular cross section slidable in said casing members between retracted and extended positions; and pivot means supported by said casing members and said base beam and connected with each cross beam, said pivot means defining an axis of rotation spaced from an edge of said cross beam a distance approximating the distance of said axis from a plane defined by said foldable floor structure when unfolded; said base beams being pivotable between a flatwise condition for sliding movement in said casing members and an edgewise position, when extended, to support said foldable floor.

9. A floor supporting structure for expandable trailers having a fixed section and a movable section, the fixed section having a fixed floor, the movable section having a longitudinally extending base beam movable to and from the fixed floor, and a pair of longitudinally foldable floor panels hinged to each other and to said fixed floor and base beam for movement between an unfolded condition coplanar with said fixed floor and an upwardly folded condition, said supporting structure comprising: an under frame for the fixed floor including transversely disposed casing members of greater horizontal width than vertical height, the horizontal width approximating the vertical distance between said casing members and said fixed floor; a set of cross beams of rectangular cross section slidable in said casing members between retracted and extended positions; anchor guides slidable in said casing members inwardly of said cross beams; pivot means interconnecting each anchor guide and corresponding cross beam, the distance between the axis of said pivot means and an edge of said cross beam being approximately the distance from said pivot means axis and the undersurface of said foldable floor when unfolded; and pivot elements coaxial with said pivot means connecting the extended ends of said cross beams with said longitudinal base beam; said base beams being pivotable between a flatwise condition for sliding movement in said casing members and an edgewise position, when extended, to support said foldable floor.

10. A floor supporting structure for expandable trailers having a fixed section and a movable section, the fixed section having a fixed floor, the movable section having a longitudinally extending base beam movable to and from the fixed floor, and a pair of longitudinally foldable floor panels hinged to each other and to said fixed floor and base beam for movement between an unfolded condition coplanar with said fixed floor and an upwardly folded condition, said supporting structure comprising: an under frame for the fixed floor including transversely disposed casing members of greater horizontal width than vertical height, the horizontal width approximating the vertical distance between said casing members and said fixed floor; a set of cross beams of rectangular cross section slidable in said casing members between retracted and extended positions; anchor guides slidable in said casing members inwardly of said cross beams; pivot means interconnecting each anchor guide and corresponding cross beam, the distance between the axis of said pivot means and an edge of said cross beam being approximately the distance from said pivot means axis and the undersurface of said foldable floor when unfolded; pivot elements coaxial with said pivot means connecting the extended ends of said cross beams with said longitudinal base beam; said base beams being pivotable between a flatwise condition for sliding movement in said casing members and an edgewise position, when extended, to support said foldable floor; means operable as said cross beams reach their extended positions for simultaneously pivoting said cross beams to their edgewise position; and means operable on initial retraction of said cross beams for pivoting said cross beams to their flatwise condition for sliding movement into said casing members.

References Cited in the file of this patent

UNITED STATES PATENTS 2,898,144     Ferrera _____ Aug. 4, 1959

FOREIGN PATENTS 528,037     Canada _____ July 24, 1956